UNITED STATES PATENT OFFICE.

JOSEPH E. JOHNSON, JR., OF HARTSDALE, NEW YORK.

PROCESS OF PRODUCING FERRO-SILICON IN BLAST-FURNACES.

14,547. Specification of Reissued Letters Patent. Reissued Nov. 12, 1918.

No Drawing. Original No. 1,231,260, dated June 26, 1917, Serial No. 104,779, filed June 20, 1916. Application for reissue filed October 8, 1918. Serial No. 257,427.

*To all whom it may concern:*

Be it known that I, JOSEPH E. JOHNSON, Jr., a citizen of the United States of America, residing at Hartsdale, in the county of Westchester and State of New York, have invented certain new and useful Improvements in Processes of Producing Ferro-Silicon in Blast-Furnaces, of which the following is a specification.

This invention relates to a process of smelting ores in the blast furnace, and has reference more particularly to the production of ferro-silicon in the blast furnace in an economical manner, and the invention consists in the employment of a blast containing more oxygen than a blast of atmospheric air, as a result of which I am enabled to produce low grade ferro-silicon such as is produced in the standard blast furnace, but at much less expense; and am also enabled to produce at comparatively small expense, high grade ferro-silicon such as can now only be produced in the electric furnace at great expense.

There are at present in common use, two varieties of commercial ferro-silicon, one produced in the blast furnace and the other produced in the electric furnace. The first variety, while comparatively inexpensive to produce, is low in its percentage of silicon, and the second variety, while very high in silicon content, commonly 50% or more, is expensive to produce on account of the high electric current consumption. By the employment of my improved process, by properly proportioning the amount of oxygen used in the blast, I can produce either a low grade ferro-silicon at much less expense than it is now produced in the standard blast furnace employing the usual blast of atmospheric air, or I can produce a ferro-silicon containing a high silicon content, and at far less expense than the same can be produced in the electric furnace.

In carrying my improved method into effect, I make use of a form of blast furnace, in a general way similar to that now universally employed for smelting ores, and I charge the same with ore and fuel in the usual and well known manner. I introduce at the base of the charge, through the usual twyers, a blast which is rich in oxygen as compared with the usual blast of atmospheric air, the result of which is the production of a higher combustion temperature than is available in the furnace as ordinarily operated, and a correspondingly increased reduction of the silica. The reactions in this operation may be expressed by the following formula:

$$SiO_2 + 2C + Fe \rightleftharpoons Fe_xSi + 2CO.$$

Where atmospheric air is employed in the blast, there is about 3¾ times more by weight of nitrogen than there is of oxygen, and since, other things being equal, the temperature obtainable is inversely proportional to the weight of the products of combustion, the temperature produced is only about ¼ as high as would be produced by a blast of pure oxygen. In other words, the nitrogen in such large proportions in the blast acts as a dead weight on the combustion and keeps the temperature down to such point that the reduction of silica is confined to limits in which the final product contains a comparatively small per cent. of silicon, rarely above 16%.

By my invention, by employing a blast rich in oxygen, the increased temperature of combustion is very marked, and if pure oxygen were employed the gain would be so enormous that it would greatly exceed the requirements for the end in view, and since the increase of temperature need be only about 10% to 15% higher than is now obtainable with the use of atmospheric air, I find it sufficient for my purpose in producing ferro-silicon of high silicon content, to employ a blast in which the oxygen and nitrogen will be of equal weights, or in approximately that proportion. A mixture of this character is more economically produced commercially than pure oxygen, and such mixture is sufficiently rich in oxygen to obtain the temperature required, for the reduction of the silica on the desired increased scale, and for the creation of the amount of heat available at that temperature to bring about such reduction.

Ferro-silicon of high percentage as most generally employed in metallurgy, contains about equal proportions of iron and silicon in order to enable it to combine under the most favorable conditions with the molten metal in which it is incorporated. A blast in which the nitrogen and oxygen are mixed in equal or substantially equal proportions I have found admirably adapted for producing that temperature of combustion which will bring about the reduction of the silica and iron in the proportions mentioned, and a blast mixture of this character may be economically and conveniently produced and with a far smaller plant than is required for a richer mixture or for pure oxygen.

It will be manifest that I may employ oxygen in the blast in lower proportions than that mentioned, in cases where the silicon content is not to be so high, say, in cases where the silicon content is 12% or thereabouts, as is now produced in the standard blast furnace employing a blast of atmospheric air.

Having thus described my invention, what I claim is:

1. The process of producing ferro-silicon of high silicon content in a blast furnace, which consists in charging the furnace with ore and fuel, and supplying a blast rich in oxygen to reduce the silica on a scale to produce ferro-silicon containing a high percentage of silicon.

2. The process of producing a ferro-silicon of substantially 50% silicon in a blast furnace, which consists in charging the furnace with ore and fuel, and supplying a blast containing equal or substantially equal parts by weight of oxygen and nitrogen to reduce the silica on a scale to produce a ferro-silicon containing a high percentage of silicon.

3. The process of producing ferro-silicon in a blast furnace, which consists in charging the furnace with ore and fuel, and supplying a blast containing oxygen in greater proportion than in atmospheric air.

In testimony whereof I have affixed my signature hereto.

JOSEPH E. JOHNSON, Jr.